E. PENNATI & M. CATTORI.
BRAKE ACTUATING MECHANISM FOR VEHICLES AND TRAINS.
APPLICATION FILED OCT. 10, 1913.
1,136,712.
Patented Apr. 20, 1915.
2 SHEETS—SHEET 2.
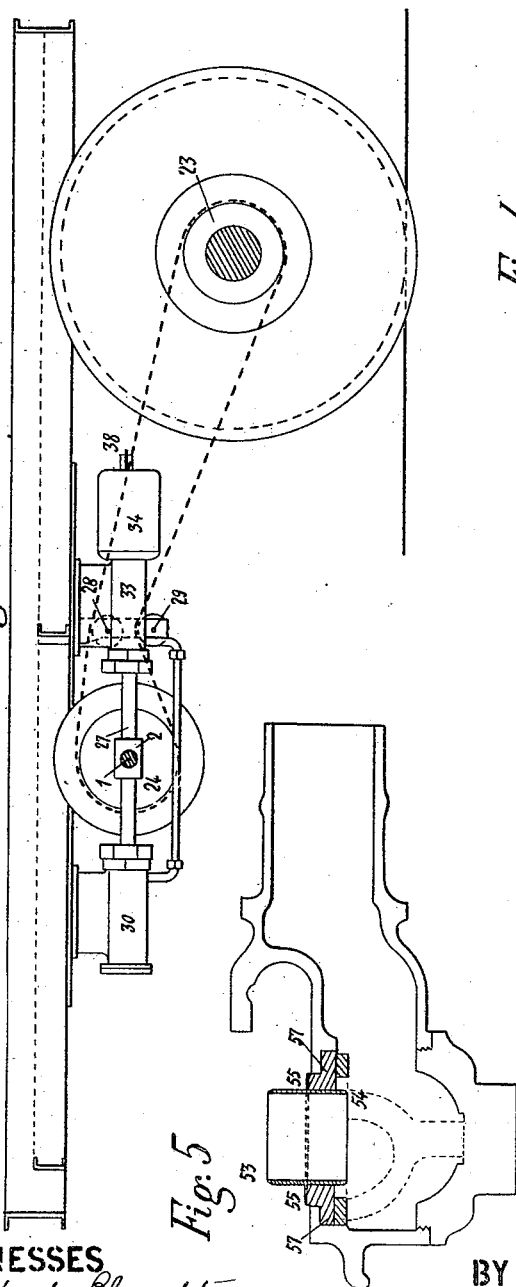
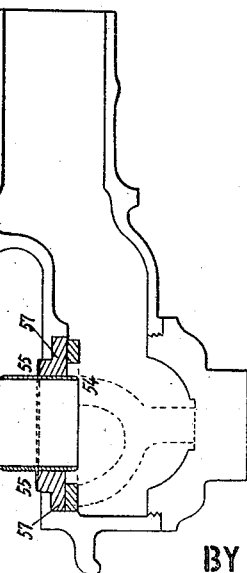
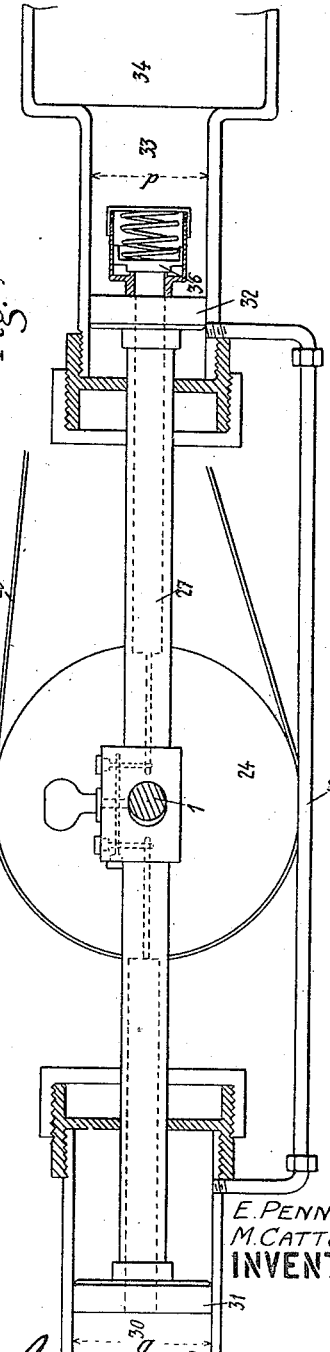
E. PENNATI.
M. CATTORI.
INVENTORS

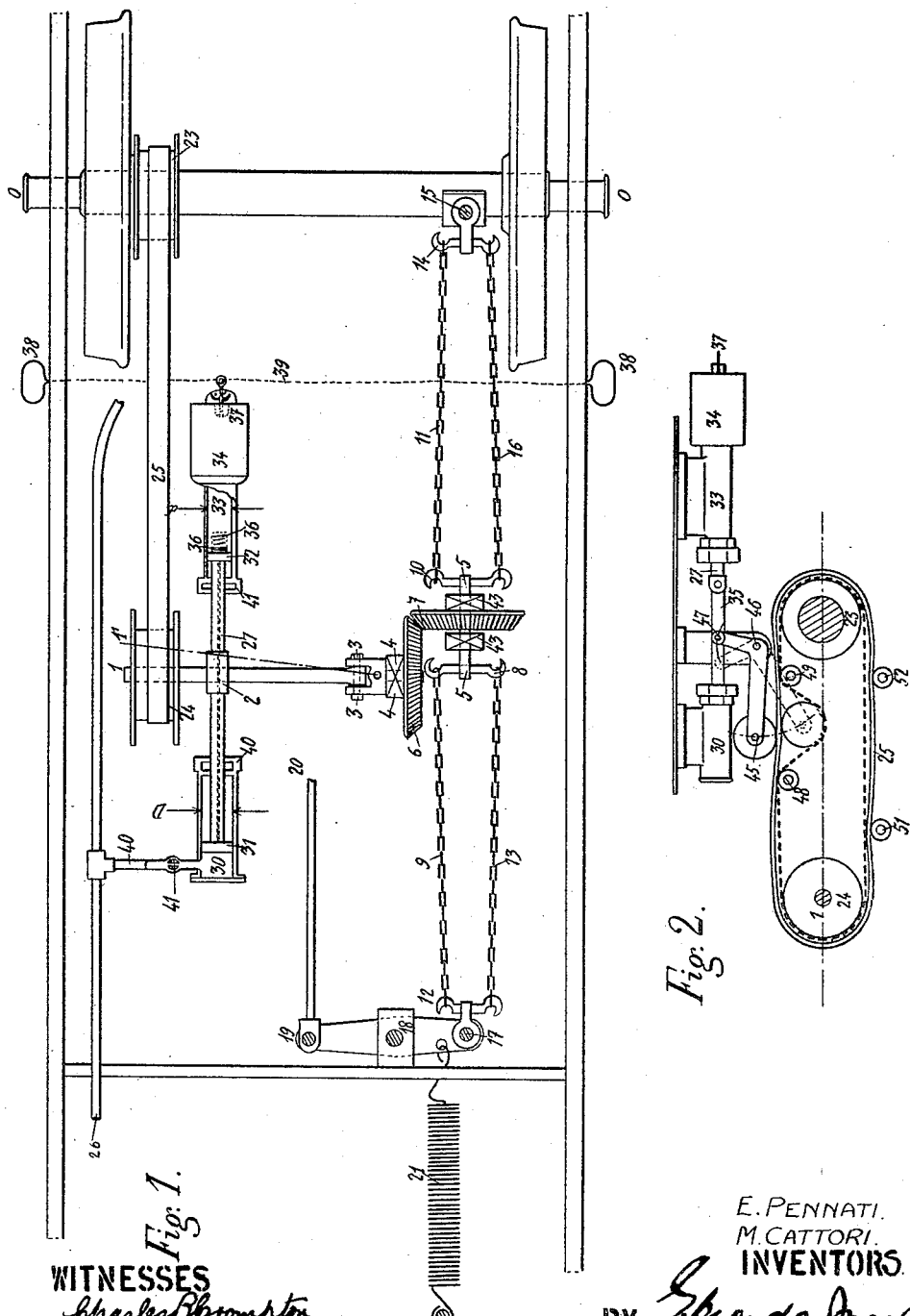

UNITED STATES PATENT OFFICE.

ERNESTO PENNATI AND MICHELANGELO CATTORI, OF CASTELLAMMARE DI STABIA, ITALY.

BRAKE-ACTUATING MECHANISM FOR VEHICLES AND TRAINS.

1,136,712.  Specification of Letters Patent.  Patented Apr. 20, 1915.

Application filed October 10, 1913. Serial No. 794,424.

*To all whom it may concern:*

Be it known that we, ERNESTO PENNATI and MICHELANGELO CATTORI, both subjects of the King of Italy, and both residing at Castellammare di Stabia, Italy, have invented a certain new and useful Improved Brake-Actuating Mechanism for Vehicles and Trains, of which the following is a specification.

This invention relates to brake actuating mechanism for vehicles and trains, of the kind in which the braking power of the brake shoes on the wheels is wholly or partly obtained from the inertia of the moving train or vehicle, and in which the fluid, compressed by a steam pump on the locomotive, and usually employed for applying the brakes, is used in the present case merely to operate a device whereby when desired, the kinetic energy of the train is brought into operative relation with the brake applying means. In this way a large proportion of the compressed air now used in applying the brake shoes, is saved thereby affording a great economy of steam and effecting a saving of coal.

As already stated, the energy employed for bringing the brake into or out of action, according to the present invention, is that of compressed air supplied by the pumps of a Westinghouse, Wenger or any other braking system, which are supposed to produce a pressure of 5 atmospheres in the air conduit of the train, the great advantage of this invention being that only one fourth of the quantity of compressed air required at present with the well known brake arrangements, is used.

Another characteristic feature of this invention is that the device is adapted to work in connection with brake devices of the kind wherein the braking is effected when the pressure falls in the main air conduit, such braking action being so much the stronger as the fall of pressure is greater, which is another characteristic feature of this invention, and the brake action ceasing when the pressure is restored. The brake is therefore automatic and adjustable to any degree that the engineer may desire. It will be therefore understood that the brake according to the present invention can be used in connection with other kinds of brakes: that is to say, a carriage supplied with the improved brake arrangement can be attached to a train, the other carriages of which have other braking systems.

Another feature of the invention is that the main air conduit can be made of a smaller size than at present, an inside diameter of the pipes of half an inch being sufficient for operating the device.

The invention will now be described with reference to the accompanying drawings in which:

Figure 1 is a diagrammatic plan of the device as fixed to a carriage frame. Fig. 2 is a diagrammatic elevation of a slight modification of the belt tightening arrangement; Fig. 3 is a side elevation of the device as shown in Fig. 1 showing the belt guiding rollers; Fig. 4 illustrates on a larger scale and in elevation a lubricating arrangement; and Fig. 5 is a detail in section of an improved coupling arrangement for the main air conduit.

In carrying the invention into effect, a pulley, 23, made in two pieces (Fig. 1), is keyed to one of the axles $o$ of the carriage, this pulley being connected to another pulley 24 keyed on a movable shaft 1 by means of a belt 25. The shaft 1 passes through an elongated hole made in a collar 2 on the piston rod 27 of the differential cylinders 30—33, (Figs. 1, 3, 4). The other end of the shaft 1 is connected by means of a universal or Hooke's joint to the spindle 4 of a bevel toothed wheel 6 gearing with another bevel toothed wheel 7, the spindle 5 of which, while compelled to rotate with the wheel, is adapted to slide axially. At each end of the spindle 5 is fixed a cross bar to which two chains or wire ropes are hooked, these chains 11, 16 and 9, 13 connecting respectively the cross bar 10 to a cross bar 14 bolted at 15 on to the carriage frame, and to the cross bar 12 bolted to one end of the lever 19 pivoted to the carriage frame, the other end of which lever 19 is pivotally connected to the rod 20 that connects the lever with the wheel shoes. The lever 19 is controlled by a strong spring 21.

26 is the main air conduit, which is of a reduced diameter in comparison with other systems and is connected with a branch pipe 40 supplied with a stop valve 41 to the cylinder 30.

30 and 33 are two cylinders opposite one another, the diameter D of the former being larger than the diameter $d$ of the latter, which is made with a large chamber 34 at the back, supplied with a valve 37 that may be worked from outside the carriage by means of a handle 38 and a chain or rope 39 fixed to said valve. The pressure in the differential cylinders 30—33, can be exhausted by hand by opening the said valve 37 when the carriage is disconnected from the locomotive.

The pistons 31, 32 of the cylinders 30, 33 respectively, are rigidly connected to one another by means of a rod 27, both the pistons and the rod being pierced by an axial channel which gives passage to compressed air from the cylinder 30 to the cylinder 33, such channel being conveniently diverted at the collar 2 so as to pass round the opening for the shaft 1 as shown in dotted lines in Fig. 4.

The hole in the piston 32 of the cylinder 33 is adapted to be closed by a valve 36 on which a spring exerts a convenient pressure. Owing to the combined effect of the difference in the diameters D and $d$, and of the action of the spring on the valve 36, a difference of pressure is produced in the two cylinders, so that, when the pressure is "on" in the main conduit, the differential piston rod 27 will be pushed toward the right side of the figures, and the shaft 1 will take the position $1^1$ shown in Fig. 1 in dotted lines, in which it is obvious that the belt 25 is slack. Consequently the rotation of the wheel 23 will have no effect on the wheel 24, on its shaft 1 and on the wheels 6 and 7, and the brake shoes will be loose. But, as soon as the pressure in the main conduit goes down, the compressed air remaining in the chamber 34 will act on the piston 32, close the valve 36 and push the pistons and piston rod toward the left side of the figure in which the shaft 1 will assume the position shown in full lines in Fig. 1. The belt 25 will then be tight, and its friction on the pulley 24 will cause this to rotate, its rotation being communicated to the shaft 1 and wheels 6 and 7. The latter will cause its spindle 5 to rotate and twist the chains 11, 16 and 9, 13 respectively the one with the other. This twisting will in its turn shorten the length of the chains, so that the lever 19 and the connecting rod 20 will be pulled with great force, the shoes being thus applied to the tires and braking the wheels of the carriage. When the twisting energy of the chains becomes equal to the rotating energy of the pulleys 23, 24, the belt will slide on them and the braking energy will be kept constant. It is obvious that by this means the greater the drop in pressure, the farther toward left will the differential rod go, and the stronger will the twisting of the chains be, so that the braking power will be stronger. Thus the engineer will be able to regulate the braking action by varying the drop of pressure of compressed air. On the pressure being restored in the main conduit, the air entering the cylinder 30 will push the differential rod 27 toward the right side of the figure, and the belt will consequently become slack; the pulley 24 will cease rotating and the chains will naturally untwist so that the spring 22 will act on the lever 19 and the brake shoes will be loosened.

In order to avoid unnecessary friction on the differential piston rod 27 in its axial movements, which would hinder the quick action of the brake, the belt pull must be effected axially with regard to said rod 27; therefore the belt must be guided by convenient rollers 28, 29 as shown in Fig. 3. When however the carriage frame permits it, a slightly different arrangement for tightening the belt as illustrated in Fig. 2 may be adopted. In this case the shaft 1 is fixed and supported by special bearings. A convenient oscillating connecting rod 35 is pivoted to the differential rod 27 and to the end 47 of a bell crank pivoted at 46 on the carriage frame, the other end 45 of such bell crank being supplied with a roller pressing on the belt 25. When the pressure in the main conduit is "on", the bell crank will be in the position traced in full lines in Fig. 2; when on the contrary the pressure drops, on the differential rod 27 being pushed toward the left, the bell crank will assume the position shown in figure in dotted lines, in which the roller 45 presses upon the belt and tightens it as shown in the thick dotted lines in said Fig. 2.

In Fig. 4 is given a diagrammatic sketch of the lubricating arrangement of the differential cylinder and rod. It consists of a bent pipe 42 connecting the cylinder chambers 30 and 33 with one another into both of which the pipe enters just behind the packing box for the rod. The pipe 42 being kept full of thick oil, it will be easily understood that, while the pistons 31 and 32 go to and fro, the air existing in front of them will force the oil to go from one side to the other and lubricate the walls of the cylinders, so maintaining constant and effective lubrication of the pistons.

In connection with the device specified above a means for packing the air conduit joints is illustrated in Fig. 5. This consists in a ferrule 53 supplied with projections 55 which is placed in the joint, the projections being introduced into convenient recesses or holes of the joint piece. The addition of this ferrule will have for effect that when the joint is disconnected while the conduit is under pressure, the friction that takes place will be exerted between this metallic ferrule and one of the rubber packings, while in the joints used at present, the friction is exerted between two rubber rings, and the rubber is soon spoilt, so that the joints soon get out of order and a waste of compressed air ensues. The construction just specified prevents this and is a new cause for economy of steam and coal.

It is obvious that many details may be changed or modified in the present device without changing the essential features of the invention. For an instance, half the twisting device illustrated in Fig. 1 can be dispensed with. Or, instead of being connected to a fixed cross bar, the right side part of such twisting device can be hooked to another horizontal lever similar to lever 19, acting on another connecting rod for actuating the brake shoes. By means of this modification the device would apply brake shoes to both carriage wheels and besides the spindle 5 would be fixed in the wheel 7, and the friction that is developed in its axial movements would be averted. The cross bars may also be replaced by disks made with holes to which the twisting chains can be hooked.

Having now described our invention, what we claim as new and desire to secure by Letters Patent is:—

1. An automatic device for actuating brake shoes for vehicles and trains, comprising a pressure main, brake shoes for the wheels, brake applying means operated by the moving train, an actuating bar to bring the brake applying means into or out of action, a pair of cylinders in alinement, and differing in diameter, a piston in each cylinder, a hollow piston rod connecting the pistons together and attached to the said actuating bar, a communicating pipe between the larger cylinder and the pressure main, a non-return valve on the hollow piston rod and within the smaller cylinder, whereby the actuating bar is moved in one direction by a fall, and in the other direction by a rise of pressure in the main.

2. An automatic device for actuating brake shoes for vehicles and trains, comprising a pressure main, brake shoes for the wheels, brake applying means adapted to be operated by the moving train, an intermittently rotating shaft to bring the brake applying means into or out of action a pair of unequally-sized cylinders in alinement, a piston in each cylinder, a hollow piston rod connecting the pistons together and through a hole in which the intermittently rotating shaft passes laterally, a communicating pipe between the larger cylinder and the pressure main, a non-return valve at one end of the hollow piston rod within the smaller cylinder, whereby the intermittently rotating shaft is moved in one direction by a fall, and in the other direction by a rise, of pressure in the main for the purpose described.

3. An automatic device for actuating brake shoes for vehicles and trains, comprising a pressure main, brake shoes for the wheels, a pair of unequally-sized cylinders in alinement, a piston in each cylinder, a hollow piston rod connecting the pistons together, a non-return valve at one end of the hollow piston rod within the smaller cylinder, a brake actuating shaft passing through a lateral hole in the piston rod, rotatable brake applying means on one end of said shaft, a universal joint in said shaft, a pulley at the other end of said shaft, a pulley rotated by the train or vehicle and a power transmission band around both of the said pulleys and which is normally slack the arrangement being such that upon a fall of pressure in the main, the brake actuating shaft is swung laterally to draw the band taut so that it is rotated to operate the rotatable brake applying means, a subsequent rise of pressure causing the band to slacken.

4. An automatic device for actuating brake shoes for vehicles and trains, comprising a pressure main, brake shoes for the wheels, a pair of cylinders in alinement one being larger than the other, an enlargement at one end of the smaller cylinder, a piston in each cylinder, a hollow piston rod connecting the pistons together, a non-return valve at one end of the hollow piston rod within the smaller cylinder, a brake actuating shaft passing through a lateral hole in the piston rod, a bevel wheel at one end of said shaft, a lever fulcrumed on the frame of the vehicle, connections on end of the lever to the brake shoes, parallel flexible transmission means attached at one end to the other end of the lever and anchored at the other end to the vehicle frame, a bevel gear intermediate of the ends of the flexible transmission in gear with the bevel wheel on the brake actuating shaft, a universal joint in said shaft, a pulley at the other end of said shaft, a pulley rotated by the train or vehicle, and a power transmission band around both of the said pulleys and which is normally slack the arrangement being such that upon a fall of pressure in the main, the switch shaft is swung laterally to draw the band taut so that it is rotated to operate the rotatable brake applying means, a subsequent rise of pressure causing the band to slacken.

In testimony whereof we have signed our names to this specification in the presence of two subscribing witnesses.

ERNESTO PENNATI.
MICHELANGELO CATTORI.

Witnesses:
WILLIAM GARGINLE,
NICOLO GUONIRE.

Copies of this patent may be obtained for five cents each, by addressing the "Commissioner of Patents, Washington, D. C."